United States Patent
Uchiyama et al.

(10) Patent No.: US 7,886,592 B2
(45) Date of Patent: Feb. 15, 2011

(54) FLOW SENSOR

(75) Inventors: Hideki Uchiyama, Katsushika-ku (JP); Ken Gunji, Moriya (JP); Yuta Oshima, Moriya (JP); Hironori Sakaguchi, Tsukubamirai (JP)

(73) Assignee: SMC Kabushiki Kaisha, Tokyo (JP)

( * ) Notice: Subject to any disclaimer, the term of this patent is extended or adjusted under 35 U.S.C. 154(b) by 62 days.

(21) Appl. No.: 12/415,362

(22) Filed: Mar. 31, 2009

(65) Prior Publication Data

US 2009/0293636 A1  Dec. 3, 2009

(30) Foreign Application Priority Data

May 28, 2008  (JP) .............................. 2008-138824

(51) Int. Cl.
*G01F 5/00* (2006.01)
(52) U.S. Cl. ...................................... 73/202
(58) Field of Classification Search ............... 73/202, 73/204.22
See application file for complete search history.

(56) References Cited

U.S. PATENT DOCUMENTS 7,124,624 B2 * 10/2006 Gajdeczko et al. ........... 73/37.5

FOREIGN PATENT DOCUMENTS

| CN | 2490552 Y | 5/2002 |
| CN | 1668243 A | 9/2005 |
| CN | 2876486 Y | 3/2007 |
| JP | 03-104817 | 10/1991 |
| JP | 8-185229 | 7/1996 |
| JP | 8-297038 | 11/1996 |
| JP | 2003-149017 | 5/2003 |
| JP | 2003-523506 | 8/2003 |
| JP | 2004-355045 | 12/2004 |
| WO | WO 2004/008961 A1 | 1/2004 |

OTHER PUBLICATIONS

Office Action issued Sep. 10, 2010, in China Patent Application No. 200910146527.4.
Office Action issued Oct. 5, 2010, in Japanese Patent Application No. 2008-138824 (with partial English translation).

* cited by examiner

*Primary Examiner*—Jewel Thompson
(74) *Attorney, Agent, or Firm*—Oblon, Spivak, McClelland, Maier & Neustadt, L.L.P.

(57) ABSTRACT

A flow sensor includes a detector provided on a side surface of a body formed in a tubular shape. First and second passages formed in the interior of the body communicate with an introduction passage of the detector via first and second sensor passages. The first and second sensor passages penetrate through and open respectively on first and second projections, which project at predetermined heights from an inner circumferential surface of the body, communicating with the first and second passages. A fluid, which flows from the first passage and into the first sensor passage, after being guided to the introduction passage and the flow rate thereof detected by a detector, flows through the second sensor passage and into the second passage.

10 Claims, 10 Drawing Sheets

FLOW SENSOR

BACKGROUND OF THE INVENTION

1. Field of the Invention

The present invention relates to a flow sensor, which is capable of measuring a flow rate of a fluid, and more specifically, relates to a flow passage structure for such a flow sensor.

2. Description of the Related Art

Heretofore, for example, for measuring the flow rate of a fluid such as air or the like, a flow sensor having a fluid passage through which the fluid flows, and a sensor disposed facing the fluid passage, has been known. Such a flow sensor, for example as disclosed in Japanese Laid-Open Patent Publication No. 2003-149017, is formed with a fluid passage inside of a main block through which the fluid flows. The main block is equipped with an upstream side sensor flow passage connected to an upstream side of the fluid passage, and a downstream side sensor flow passage connected to a downstream side of the fluid passage. In addition, a sensor conduit mutually interconnects the upstream side sensor flow passage and the downstream side sensor flow passage, with a sensor element being disposed in the sensor conduit.

However, in the aforementioned conventional technique, there is a fear that moisture or the like contained within the fluid may traverse the inner wall surfaces of the fluid passages and intrude into the upstream side sensor flow passage, the sensor conduit, and the downstream side sensor flow passage. Consequently, malfunctioning of the sensor element arranged facing the sensor conduit may occur, caused by intruding moisture or the like, such that the flow rate of the fluid cannot be measured reliably by the sensor element.

SUMMARY OF THE INVENTION

A general object of the present invention is to provide a flow sensor in which intrusion of moisture with respect to a detector thereof can be prevented for improving durability of the detector, and in which lowering of detection accuracy caused by adherence of moisture or the like can be avoided.

The flow sensor of the present invention is constituted by a body having a first passage disposed on an upstream side of a path through which a fluid flows, a second passage disposed on a downstream side with respect to the first passage, and a throttle section disposed between the first passage and the second passage, a detector disposed in the body and which is capable of detecting a flow rate of the fluid that flows from the first passage toward the second passage, detection passages facing the detector, and further which communicate respectively with the first passage and the second passage, wherein the fluid is made to flow through the detection passages and toward the detector, and a pair of projections, which project respectively from inner wall surfaces of the first and second passages, the detection passages being disposed within interior portions of the projections, wherein the detection passages open into the first and second passages via the projections.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
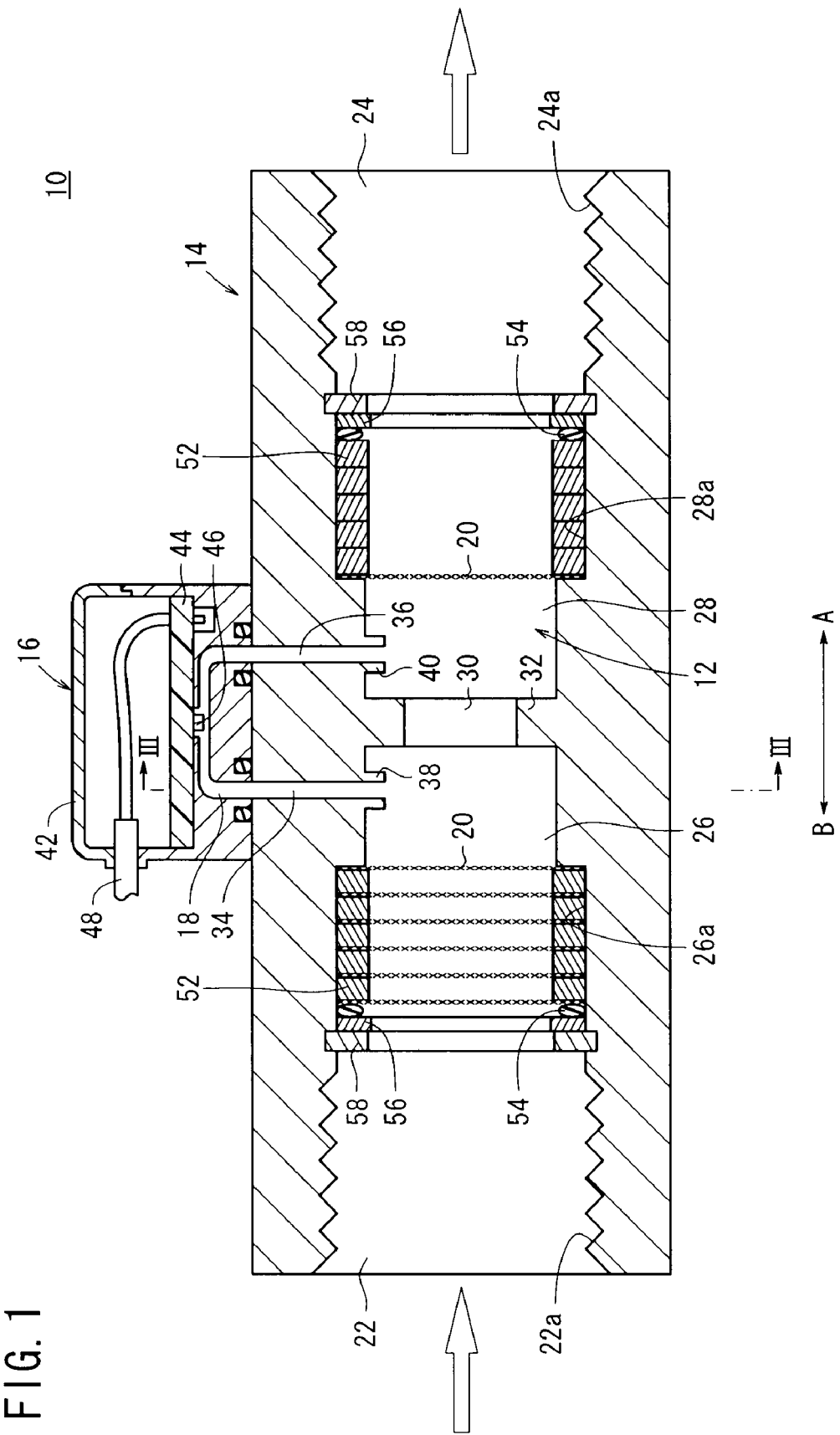
FIG. 1 is an overall structural view of a flow sensor according to an embodiment of the present invention.

In FIG. 1, reference numeral 10 indicates a flow sensor according to an embodiment of the present invention.

As shown in FIGS. 1 to 4, the flow sensor includes a body 14 having a flow passage 12 through which a fluid (e.g., air, nitrogen, or the like) flows, a detector 16 installed on an upper portion of the body 14 that detects the flow rate of the fluid, an introduction passage 18 through which the fluid is guided from the flow passage 12 toward the detector 16, and rectifying elements 20 that rectify (i.e., straighten) the flow of the fluid, and which are capable of removing debris or the like from the fluid, disposed in the flow passage 12.

The body 14, for example, is formed in a tubular shape from a metallic material, and has a first port 22 on one end thereof through which the fluid is supplied, and a second port 24 on the other end thereof through which the fluid is discharged. Respective screw threads 22a, 24a are engraved on inner circumferential surfaces of the first and second ports 22, 24 to which fitting members (not shown) connected to pipes or the like may be threaded and connected. Herein, initially, a case shall be described in which the first port 22 is utilized on an upstream side, and the second port 24 is utilized on a downstream side of the flow sensor 10 when a fluid flows therethrough.

Inside the body 14, the flow passage 12 is disposed along a straight line interconnecting the first port 22 and the second port 24. The flow passage 12 includes a first passage 26 adjacent to the first port 22, a second passage 28 adjacent to the second port 24, and a communication passage (throttle section) 30 disposed between the first passage 26 and the second passage 28. The first passage 26 extends over a predetermined length toward the side of the second port 24 (in the direction of the arrow A) from the end of the first port 22, and moreover, is formed with a reduced diameter in a radial inward direction with respect to the first port 22.

Similarly, the second passage 28 extends over a predetermined length toward the side of the first port 22 (in the direction of the arrow B) from the end of the second port 24, and is formed with a reduced diameter in a radial inward direction with respect to the second port 24.

The communication passage 30 is disposed between the end of the first passage 26 and the end of the second passage 28, and in the interior thereof, the communication passage 30 is formed with an annular wall portion 32 that projects with respect to inner circumferential surfaces of the first and second passages 26, 28. More specifically, because the communication passage 30 is formed at reduced diameter with respect to the first and second passages 26, 28, when fluid flows from the first passage 26 toward the second passage 28, the communication passage 30 functions as a throttle for throttling the flow rate of the fluid.

Furthermore, a pair of first and second sensor passages (detection passages) 34, 36 are formed in the body 14, which extend in a radial direction perpendicularly to the axial direction of the body 14. The first and second sensor passages 34, 36 communicate mutually between the first and second passages 26, 28 and the exterior of the body 14. The first sensor passage 34 opens into the first passage 26 in the vicinity of the annular wall portion 32, extending to the interior of a first projection 38, which projects radially inward with respect to the inner circumferential surface of the first passage 26, and opening at an end part thereof.

Figure 2:
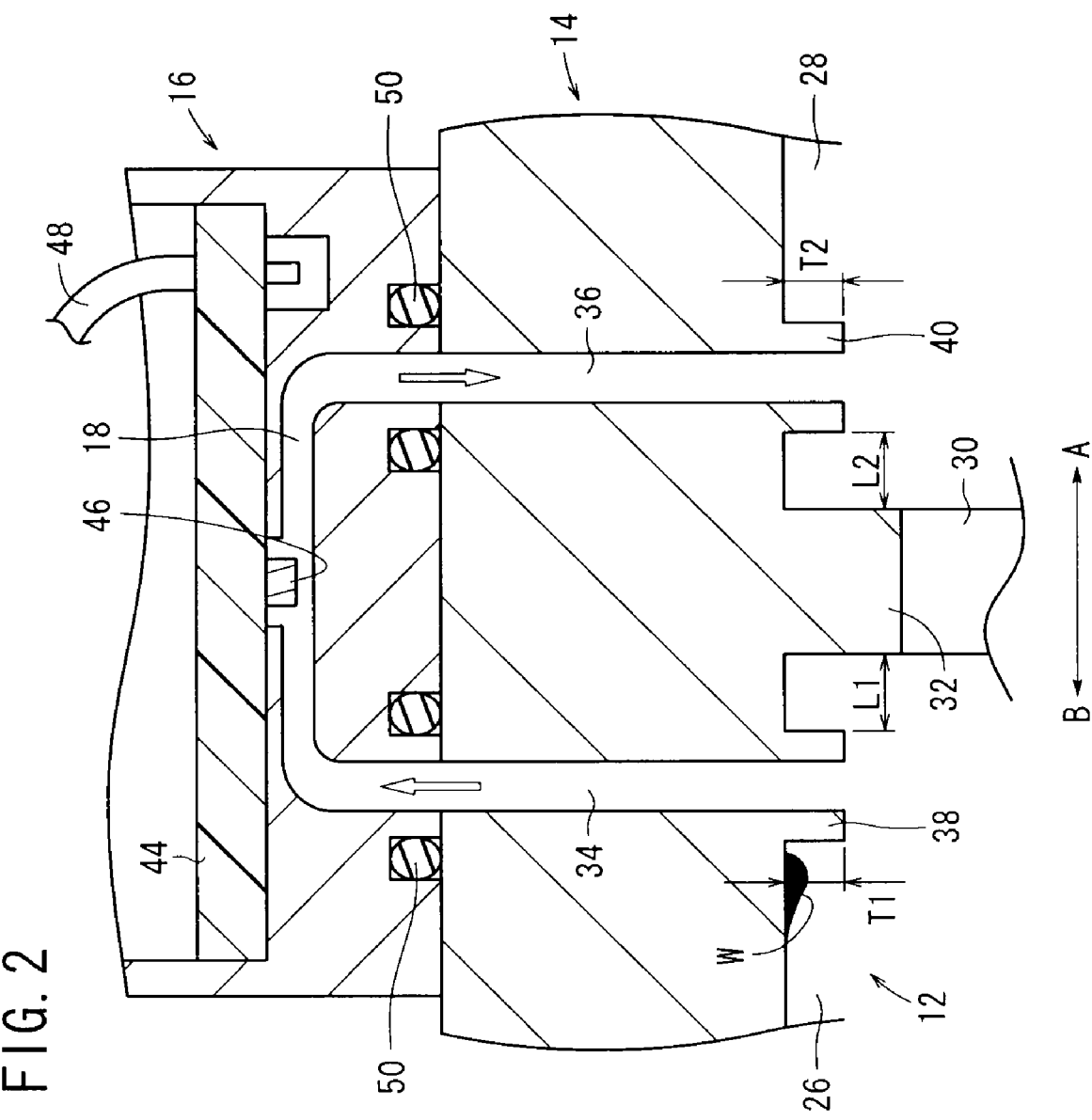
FIG. 2 is an enlarged cross sectional view showing the vicinity of a detector in the flow sensor of FIG. 1.
Figure 3:
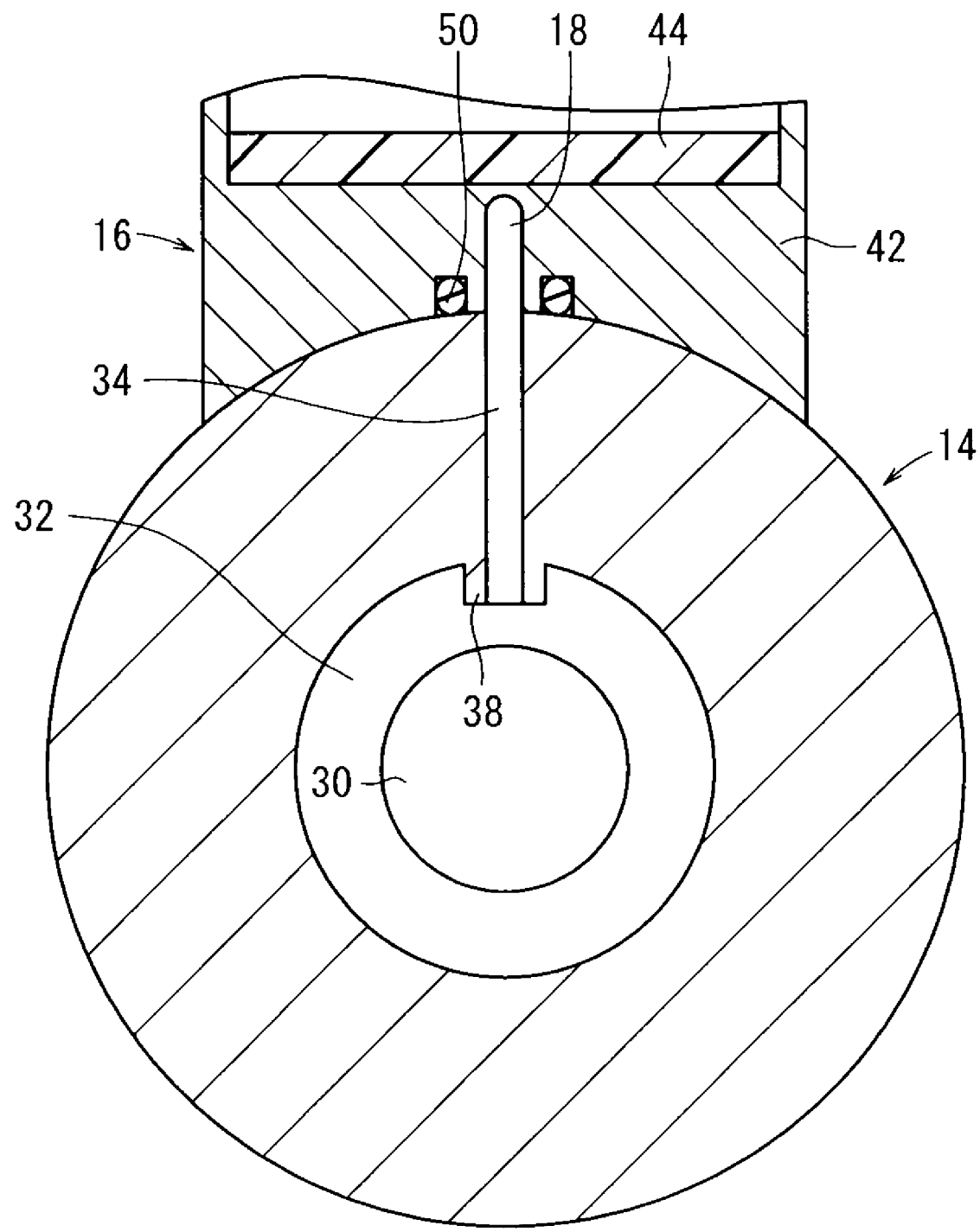
FIG. 3 is a cross sectional view taken along line III-III of FIG. 1.
Figure 4:
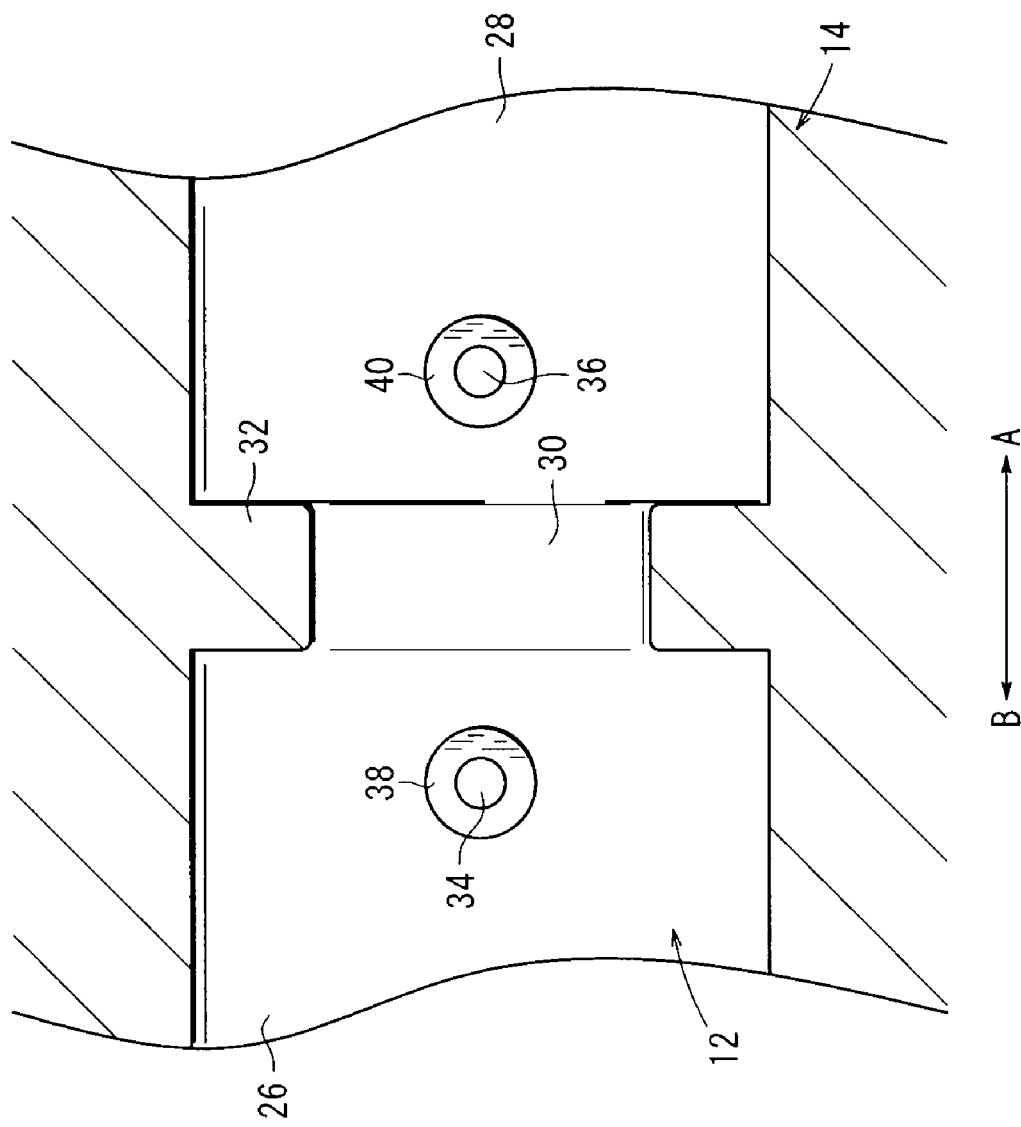
FIG. 4 is an enlarged lateral cross sectional view, in which first and second sensor passages are seen from a radial inward direction of the body, in the flow sensor of FIG. 1.

The second sensor passage 36 opens into the second passage 28 in the vicinity of the annular wall portion 32, extending to the interior of a second projection 40, which projects radially inward with respect to the inner circumferential surface of the second passage 28, and opening at an end part thereof. The first and second sensor passages 34, 36 are disposed at respective positions separated at equal intervals from the annular wall portion 32 (L1=L2, as shown in FIG. 2). As shown in FIG. 4, the first and second projections 38, 40 are formed with circular shapes in cross section, with the first and second sensor passages 34, 36 being formed respectively in the centers thereof. Further, the heights of the first and second projections 38, 40 are formed substantially the same as each other (T1=T2, as shown in FIG. 2).

Specifically, ends of the first and second sensor passages 34, 36 open at respective positions, which are separated from the inner circumferential surfaces of the first and second passages 26, 28, at predetermined heights (T1, T2) in the radial inward direction.

On the other hand, the other ends of the first and second sensor passages 34, 36 open on the side surface of the body 14, the detector 16 being installed and mounted on the body 14 so as to cover the other ends of the first and second sensor passages 34, 36 (see FIG. 1).

The detector 16 includes a hollow casing 42, a substrate 44 accommodated inside the casing 42, a detector element 46 disposed on the substrate 44, the introduction passage 18 that opens on a side surface of the casing 42, and through which the fluid is introduced from the first sensor passage 34, and a lead wire 48 connected electrically with respect to the substrate 44.

The casing 42 is fastened to the body 14 by non-illustrated bolts, and is formed with the introduction passage 18 therein, the introduction passage 18 being substantially U-shaped in cross section and formed on a bottom portion of the casing 42 facing the body 14. One end of the introduction passage 18 is connected to the first sensor passage 34, whereas the other end thereof is connected to the second sensor passage 36. Consequently, the introduction passage 18 communicates with the first and second passages 26, 28 through the first and second sensor passages 34, 36.

Sealing rings 50 are disposed respectively in the side surface of the casing 42 installed on the body 14 through annular grooves that surround the openings of the introduction passage 18, and are sandwiched between the casing 42 and the body 14. Owing thereto, leakage of fluid to the exterior between the first and second sensor passages 34, 36 and the introduction passage 18 is prevented.

The substrate 44 is disposed in parallel with the axis of the body 14, and in a central part of the lower surface thereof, the detector element 46 is arranged so as to face toward the introduction passage 18. The detector element 46, for example, is capable of detecting the flow rate of fluid in the introduction passage 18, wherein the detection result detected by the detector element 46 is output to a non-illustrated controller or display device through the substrate 44 and the lead wire 48.

The rectifying elements 20 are made up from thin plates having plural opening holes therein, which are formed so that fluid is capable of permeating the rectifying elements 20 while passing through the opening holes thereof. The rectifying elements 20 are formed with circular shapes in cross section, a plurality (e.g., six) of which are disposed along the axial direction (the direction of arrows A and B) of the body 14, while separated by equal intervals, and which are inserted into an expanded diameter portion 26a of the first passage 26. In addition, the rectifying elements 20 are sandwiched between and fixed mutually by ring-shaped spacers 52, which are inserted into the expanded diameter portion 26a.

On the other hand, a rectifying element 20 also is gripped between an end of the expanded diameter portion 28a and ring shaped spacers 52, which are inserted into the expanded diameter portion 28a of the second passage 28, thereby fixing the rectifying element 20 therein.

In addition, o-rings 54 are disposed so as to abut against the rectifying element 20 and the spacer 52 in open ends of the first and second expanded diameter portions 26a, 28a, and are affixed by latching rings 58 that engage in the inner circumferential surface of the body 14, sandwiching ring-shaped pressing plates 56 therebetween. Accordingly, the rectifying elements 20 and the spacers 52 are fixed firmly inside the first and second passages 26, 28 to prevent loose fitting and rattling of such members.

In this manner, by providing the rectifying elements 20 inside the first passage 26 and second passage 28, the fluid that flows through the interior of the body 14 passes through the opening holes thereof and penetrates the rectifying elements 20, whereby the fluid is rectified, and the fluid can be introduced into the first and second sensor passages 34, 36 in a stabilized condition. Consequently, a stable flow rate of the fluid can be detected by the detector 16.

Further, by arranging a plurality of rectifying elements 20 inside the first passage 26, when the fluid flows therethrough, large quantities of debris and the like can be removed from inside the first passage 26 on the upstream side. On the other hand, by arranging a single rectifying element 20 inside the second passage 28 on the downstream side, in the remote chance that the fluid flows in reverse, debris and the like can also be removed by the rectifying element 20.

Figure 5:
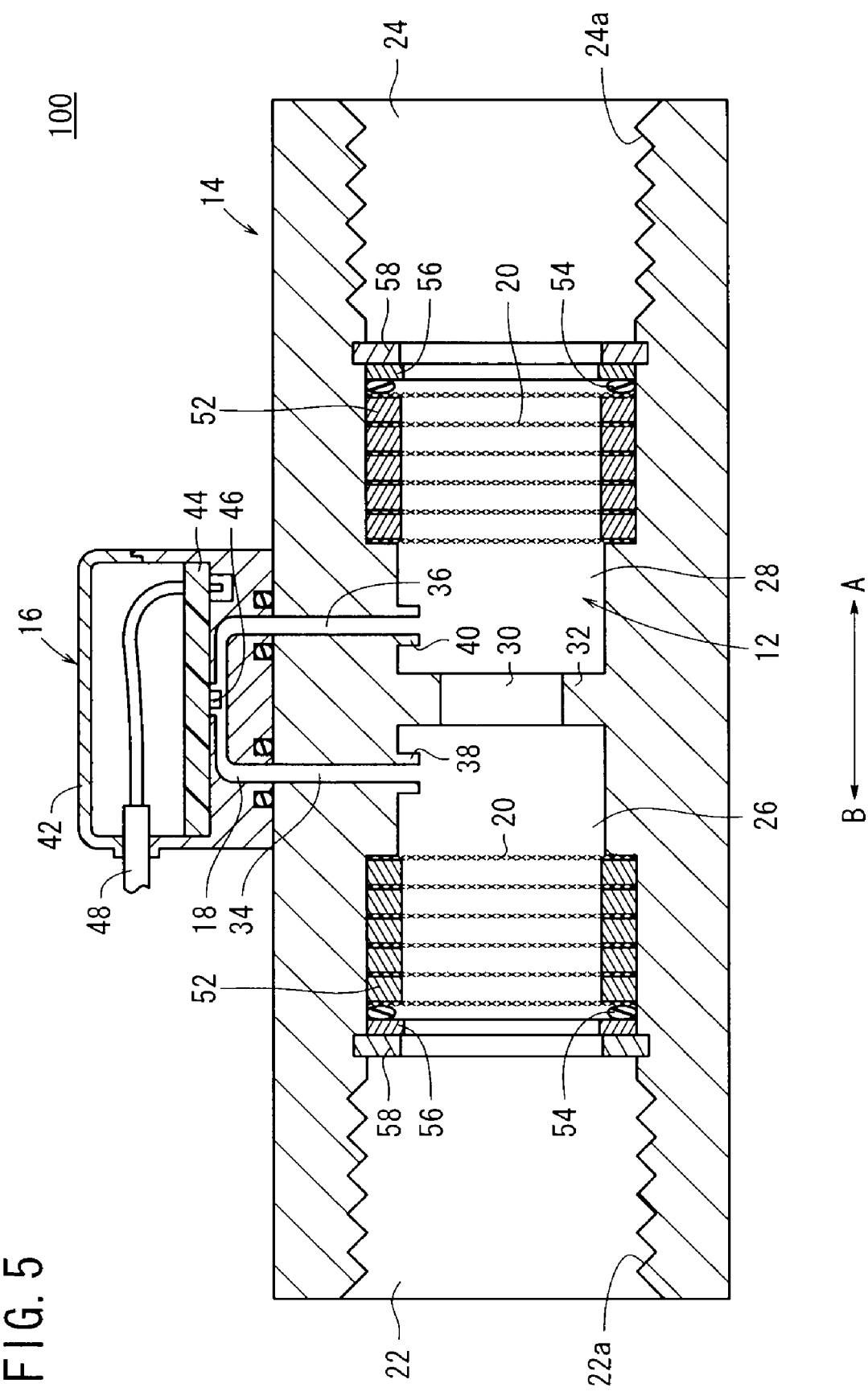
FIG. 5 is an overall structural view of a flow sensor according to a modified example, in which plural filters are disposed in a second passage thereof.

In the flow sensor 100, as shown in FIG. 5, a plurality of (e.g., six) rectifying elements 20 may also be disposed on the side of the second passage 28, in a same manner as the first passage 26. By providing this structure, for example, even in the case that the side of the second passage 28 is arranged on an upstream side, such that the fluid is made to flow from the second passage 28 to the side of the first passage 26, debris and the like can be removed reliably by the plural rectifying elements 20. In addition, when the fluid flows therethrough, because a bidirectional rectifying effect can be obtained, the flow sensor 100 can be used in both directions, and usage of the flow sensor 100 including the body 14 is not limited to one direction only.

The flow sensor 10 according to the embodiment of the present invention is basically constructed as described above. Next, with reference to FIG. 1, explanations shall be made concerning operations and effects of the present invention.

First, fitting members (not shown), which are connected to pipes, are connected with respect to the first and second ports 22, 24, and a fluid (e.g., air) is supplied to the first port 22. Air that has been supplied to the first port 22 penetrates through the plural rectifying elements 20 and flows therethrough into the first passage 26. At this time, debris or the like contained within the fluid is captured and removed by the plural rectifying elements 20 inside the first passage 26.

In addition, the fluid flows through the reduced diameter communication passage 30 and into the second passage 28, while a portion of the fluid flows into the first sensor passage 34 and passes therethrough to the introduction passage 18. Fluid that has been introduced to the inside of the introduction passage 18, after having flowed past the introduction passage 18 and through the second sensor passage 36, is guided out into the second passage 28, whereupon the fluid merges with the fluid that has flowed from the first passage 26 and through the communication passage 30, and then flows together therewith toward the side of the second port 24 (in the direction of the arrow A). Also, the flow rate of the fluid that flows inside the introduction passage 18 is detected by the detector element 46. The flow rate is output as a detection signal through the substrate 44 and the lead wire 48, to a controller, a display device, or the like.

Figure 6:
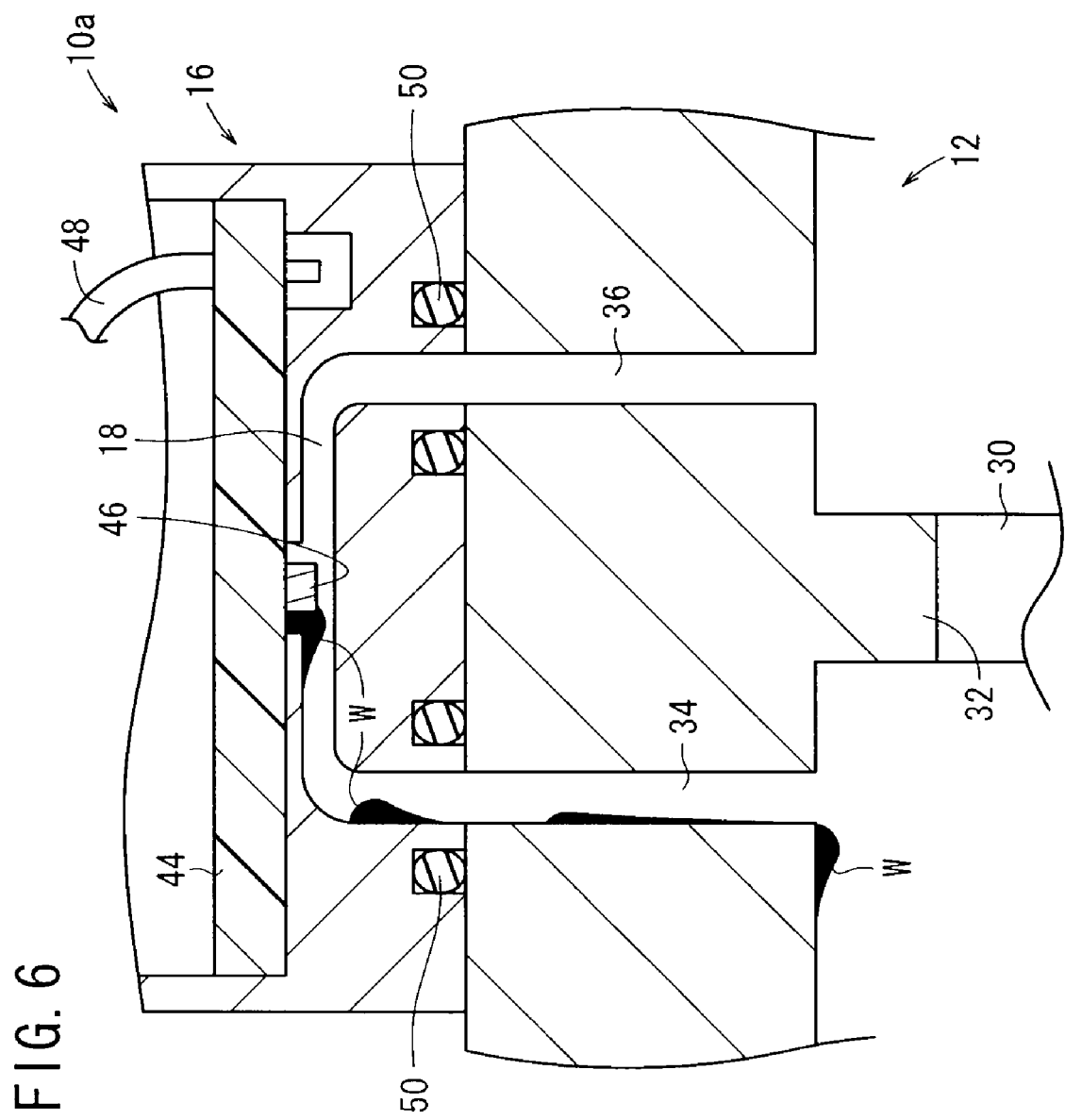
FIG. 6 is an enlarged cross sectional view showing a conventional flow meter in accordance with a comparative example, in which first and second projections are not provided.

At this time, cases frequently occur in which moisture, oils or the like W are contained within the fluid, as shown in FIG. 2. Such moisture, oils or the like W adhere to the inner circumferential walls of the first passage 26 and move gradually toward the downstream side (in the direction of the arrow A) accompanying the flow of the fluid. For example, with a conventional flow sensor 10a as shown in FIG. 6, moisture, oils or the like W, which have traversed the inner circumferential surface of the flow passage 12 in the body 14, intrude into the first sensor passage 34 that opens on the inner circumferential surface, and after having moved unimpeded through the first sensor passage 34 to the side of the detector 16, become adhered onto the detector element 46. The detector element 46 of this type generally is vulnerable to moisture, oils or the like W, and thus there is a fear that the detector element 46 could become damaged or malfunction due to adherence of such moisture, oils or the like W.

In contrast to the conventional technique, according to the present invention, as shown in FIG. 2, because the first and second sensor passages 34, 36 open respectively into the first and second passages 26, 28 via the first and second projections 38, 40, which project from inner circumferential surfaces of the first and second passages 26, 28, moisture, oils or the like W, which have moved toward the downstream side of the body 14 traversing the inner circumferential surfaces of the first and second passages 26, 28, are prevented from directly entering and intruding into the first and second sensor passages 34, 36.

In the foregoing manner, according to the first embodiment, ends of the first and second sensor passages 34, 36, which open onto sides of the first and second passages 26, 28, are made to open on the first and second projections 38, 40, which project in a radially inward direction from the inner circumferential surface of the first and second passages 26, 28. Owing thereto, even in the event that moisture, oils or the like W contained within the fluid adhere to the inner circumferential walls of the first and second passages 26, 28, such moisture, oils or the like W are prevented from directly entering and intruding into the first and second sensor passages 34, 36.

More specifically, the open ended portion of the first sensor passage 34 through which a portion of the fluid is directed to the detector 16, and the open ended portion of the second sensor passage 36 through which the fluid is guided out after having passed the detector 16, do not open directly onto the inner wall surfaces, respectively, of the first and second passages 26, 28. Rather, by means of a simple structure whereby the first and second sensor passages 34, 36 open on the first and second projections 38, 40, which project from the first and second passages 26, 28, intrusion of moisture, oils or the like W into the first and second sensor passages 34, 36 can be prevented.

As a result, the detector element 46 that makes up the detector 16 is not damaged by moisture, oils or the like W becoming adhered thereto, such that the durability of the detector 16 can be enhanced, while also enabling the maintenance cycle of the detector 16 to be prolonged.

Further, lowering of detection accuracy, which is of concern in the case that moisture, oils or the like W become adhered to the detector 16, is not brought about, so that the flow rate can be detected with a high degree of accuracy at all times.

Figure 7:
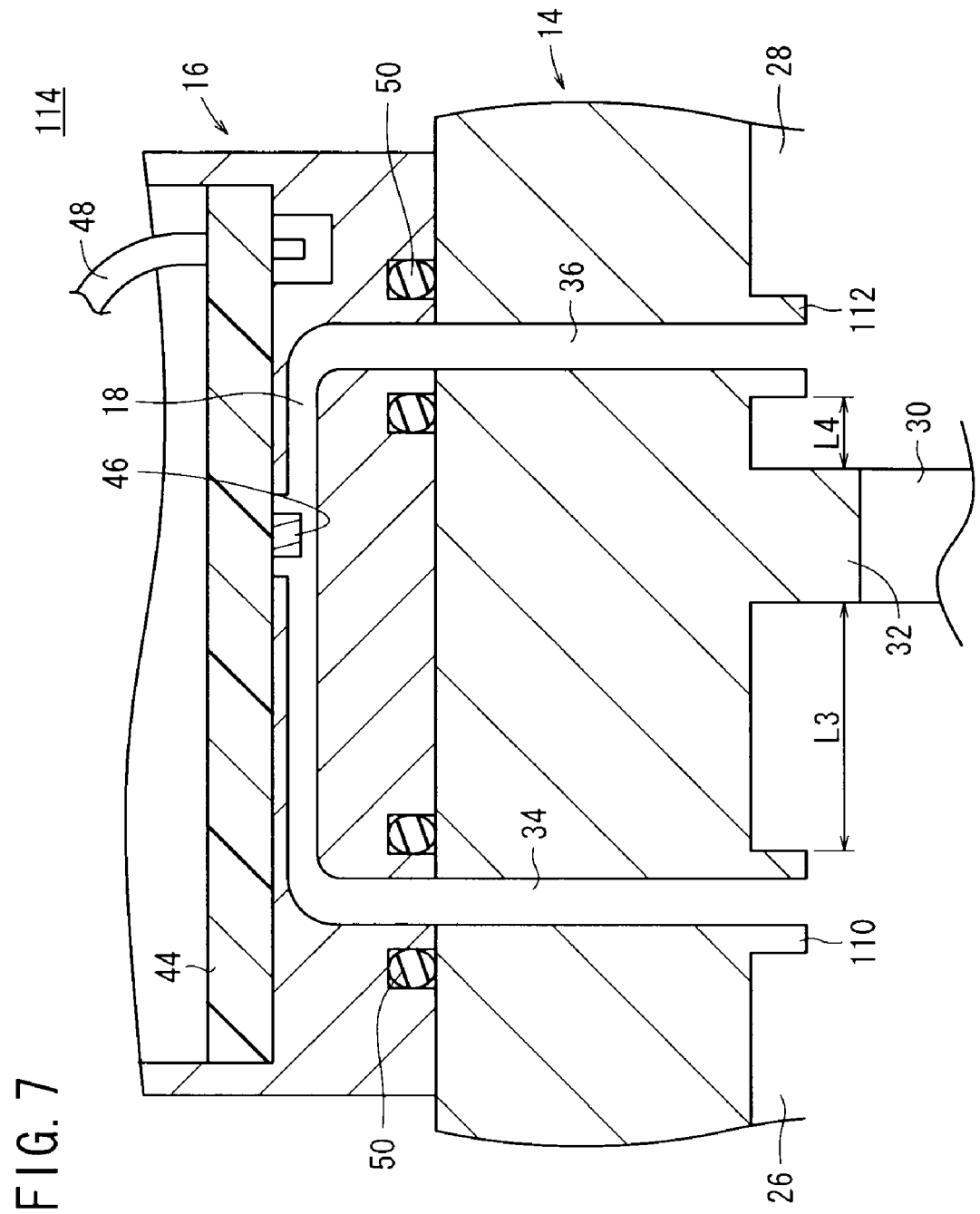
FIG. 7 is an enlarged vertical cross sectional view of a flow sensor according to a modified example, in which respective distances of first and second projections with respect to an annular wall portion differ from one another.
Figure 8:
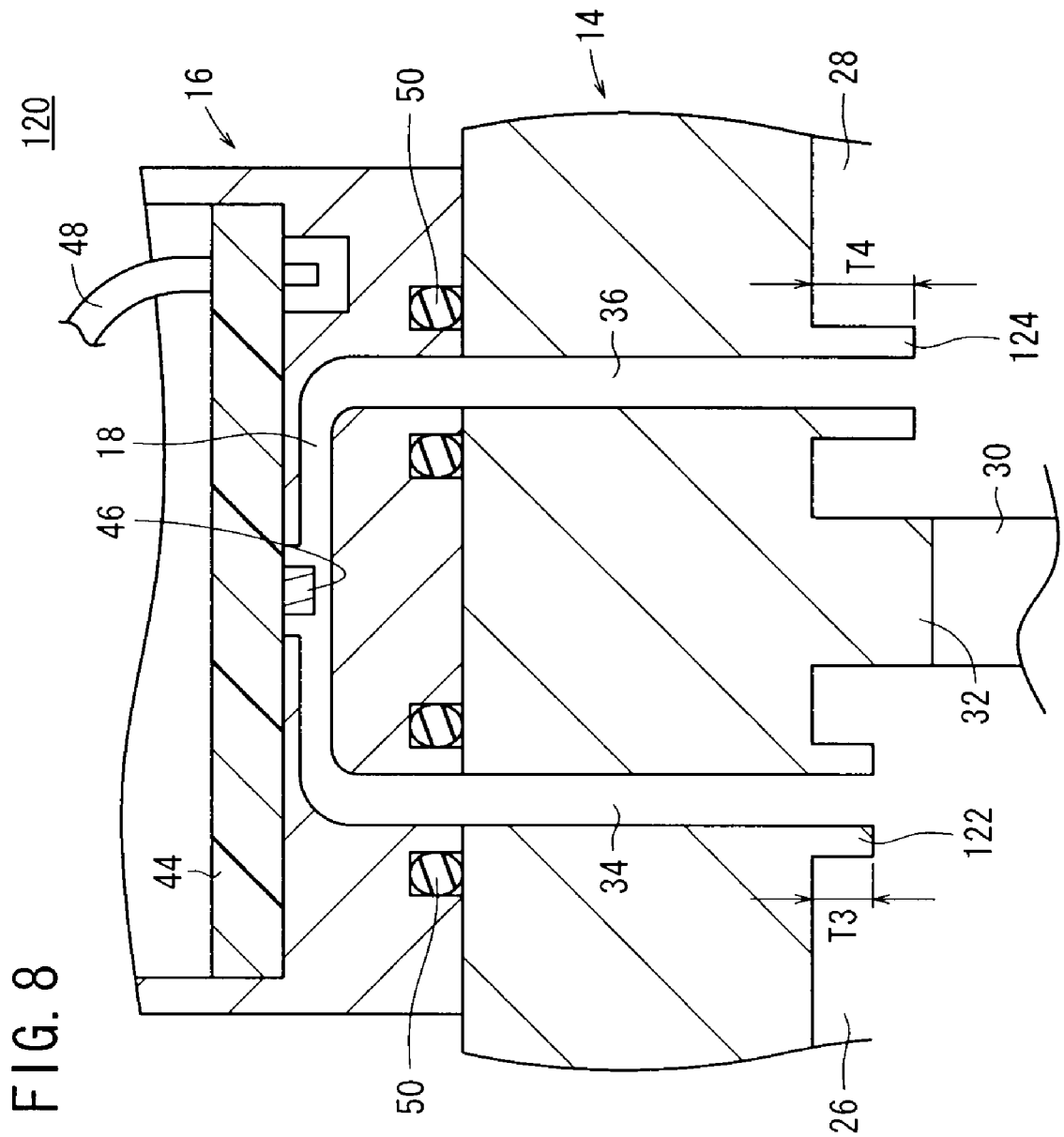
FIG. 8 is an enlarged vertical cross sectional view of a flow sensor according to a modified example, in which the projecting heights of first and second projections differ from one another.
Figure 9:
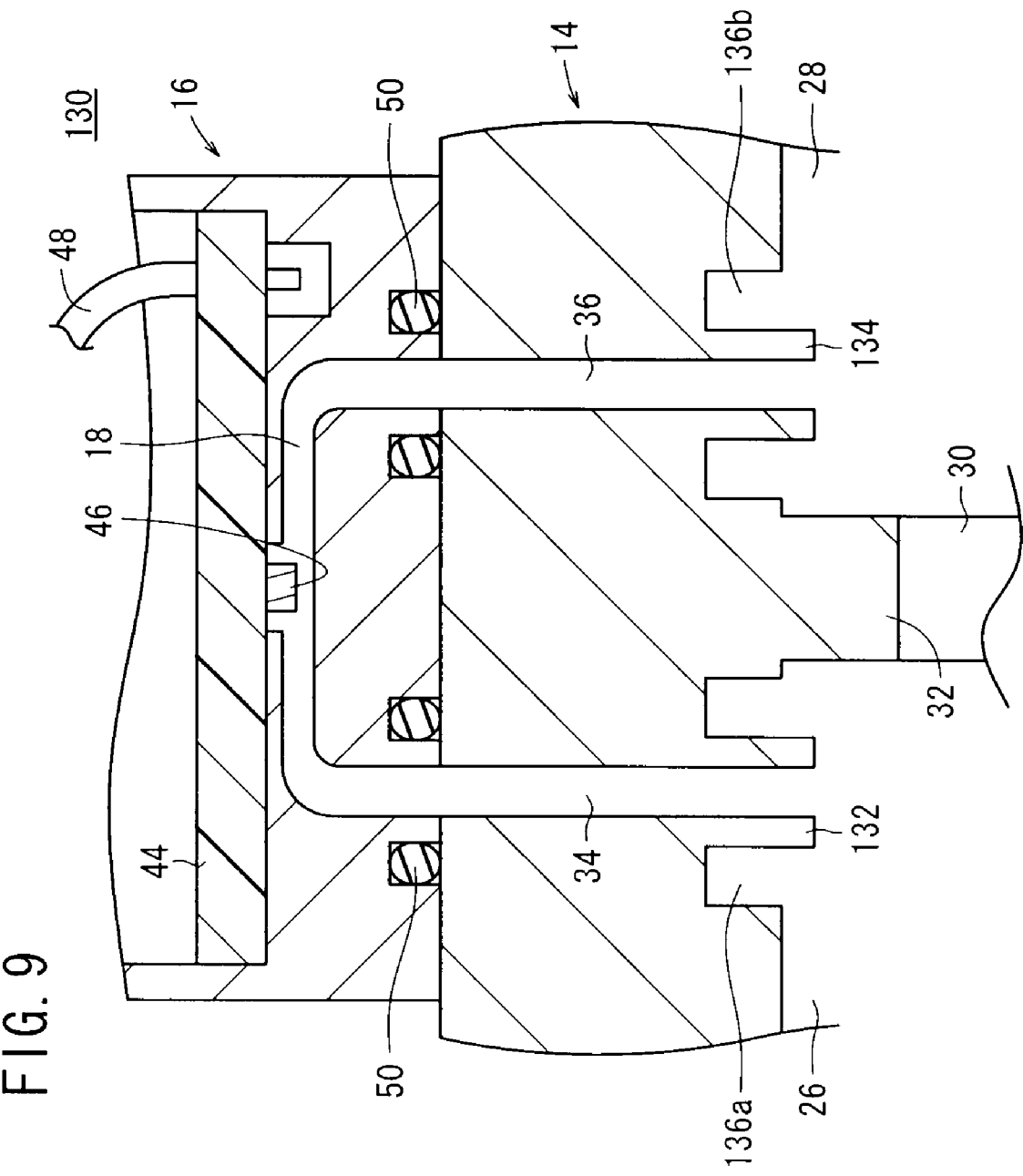
FIG. 9 is an enlarged vertical cross sectional view of a flow sensor according to a modified example, provided with annular recesses surrounding the first and second projections.

Next, with reference to FIGS. 7 through 9, explanations shall be given concerning flow sensors having first projections 110, 122, 132, 142 and second projections 112, 124, 134, 144, according to modified examples.

First, concerning the first and second projections 110, 112 in the flow sensor 114 shown in FIG. 7, the first projection 110 arranged in the first passage 26 is disposed so as to be further separated from the annular wall portion 32 than the second projection 112 arranged in the second passage 28. Specifically, the distance L3 between the first projection 110 and the annular wall portion 32 is set to be greater, compared to the distance L4 between the second projection 112 and the annular wall portion 32 (L3>L4).

In this manner, with the flow sensor 114 having the communication passage 30 functioning as a throttle, a favorable condition results when the distances from the annular wall portion 32 having the communication passage 30 are assured, such that the first projection 110 on the upstream side is spaced more greatly from the annular wall portion 32 than the second projection 112 arranged on the downstream side. For example, the distance L3 of the first projection 110 is set substantially equal to the inner diameter of the first passage 26, whereas the distance L4 of the second projection 112 is set at one-half the inner diameter of the second passage 28.

Further, as in the flow sensor 120 shown in FIG. 8, a favorable condition may also result when the height T3 of the first projection 122 with respect to the inner circumferential surface of the first passage 26 is different from the height T4 of the second projection 124 with respect to the inner circumferential surface of the second passage 28. In this case, the height T4 of the second projection 124 is set to be greater, compared to the height T3 of the first projection 122 (T3<T4).

In this manner, by changing the height T4 of the second projection 124 with respect to the height T3 of the first projection 122, the differential pressure generated in the fluid that flows inside the body 14 can be controlled. For example, as described above, by setting the height T4 of the second projection 124 to be greater than the height T3 of the first projection 122, compared to the case when the heights of both the first and second projections 122, 124 are equal, the differential pressure can be decreased.

Furthermore, as in the flow sensor 130 shown in FIG. 9, annular recesses 136a, 136b may be provided respectively around the outer circumferential sides of the first and second projections 132, 134. The annular recesses 136a, 136b are recessed at a predetermined depth with respect to the inner circumferential surface of the first and second passages 26, 28, and are formed substantially coaxially with the radial outer directions of the first and second sensor passages 34, 36.

Specifically, by providing the recesses 136a, 136b with respect to the inner circumferential surfaces of the first and second passages 26, 28, moisture, oils or the like W adhering to the inner circumferential surfaces of the first and second passages 26, 28 become trapped and retained within the recesses 136a, 136b before reaching the first and second sensor passages 34, 36, and therefore, intrusion of such moisture, oils or the like W into the first and second sensor passages 34, 36 disposed in the center of the recesses 136a, 136b can be prevented even more reliably.

Figure 10:
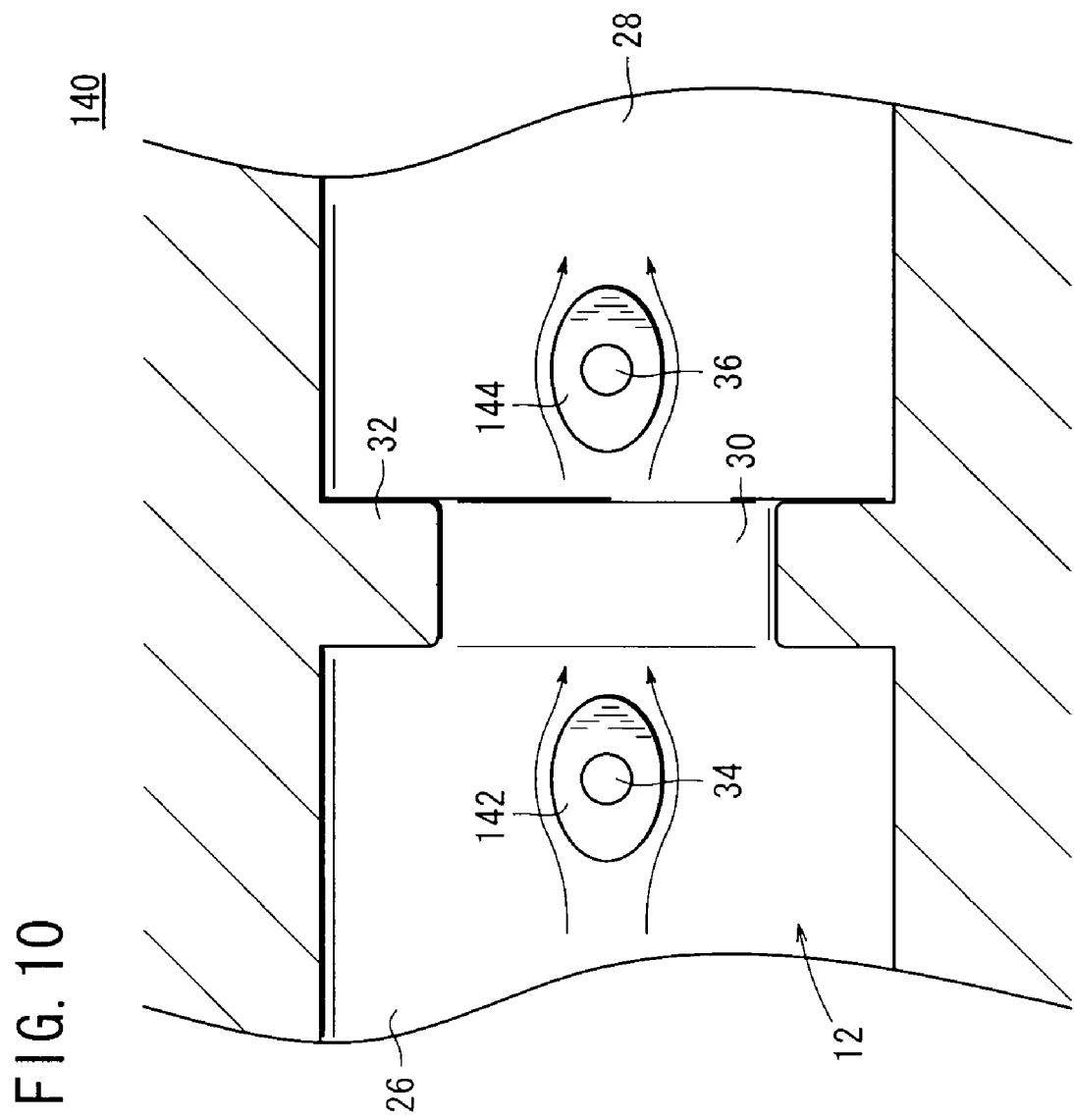
FIG. 10 is a lateral cross sectional view showing a modified example of the flow sensor, in which the first and second projections are formed with elliptical shapes in cross section.

On the other hand, the first and second projections 38, 40 that project from the inner wall surface of the body 14 are not limited to being formed with circular shapes in cross section, as described above. For example, as in the case of the first and second projections 142, 144 in the flow sensor 140 shown in FIG. 10, the first and second projections 142, 144 may be formed with elliptical shapes in cross section, having a major axis along the axial direction (the direction of arrows A and B) of the body 14 and a minor axis perpendicular to the axial direction. In this manner, by forming the first and second projections 142, 144 with elliptical shapes in cross section, when a fluid flows through the first and second passages 26, 28, the flow passage resistance is decreased and the fluid can be made to flow smoothly at a desired flow velocity. Also, even in the event that moisture, oils or the like W become adhered to the outer wall surfaces of the first and second projections 142, 144, such moisture, oils or the like W are caused to move toward the downstream side (in the direction of the arrow A) along the outer wall surfaces due to the flowing action of the fluid, and can be removed.

Further, by providing rectifying elements 20 in the interior of the body 14, because the flow of the fluid can be quickly rectified to produce a stable laminar flow, it is unnecessary to lengthen the straight line portions of unillustrated fitting members, pipes, and the like, that are connected to the first port 22 on the upstream side of the body 14 for the purpose of stabilizing the fluid flow. Therefore, the degree of freedom for the layout of such fitting members, pipes and the like can be increased.

Furthermore, for example, even in the case that a fitting member, which has a passage diameter reduced in diameter with respect to the first passage 26, is connected to the first port 22, the flow of fluid from the fitting member can be rectified by the rectifying elements 20 while being dispersed in a radial outward direction to flow stably along the expanded diameter portion 26a. As a result, even in the case that fluid is supplied from a fitting member having a smaller diameter than the first passage 26, a pressure difference can be reliably and suitably generated in the communication passage 30 by impingement of the fluid against the annular wall portion 32.

The flow sensor according to the present invention is not limited to the above-described embodiment. It is a matter of course that various other structures or modifications thereto could be adopted, without deviating from the essence and gist of the present invention as set forth in the appended claims.

What is claimed is:

1. A flow sensor comprising:
   a body having a first passage disposed on an upstream side of a path through which a fluid flows, a second passage disposed on a downstream side with respect to the first passage, and a throttle section disposed between the first passage and the second passage;
   a detector disposed in the body and which is capable of detecting a flow rate of the fluid that flows from the first passage toward the second passage;
   detection passages facing the detector, and further which communicate respectively with the first passage and the second passage, wherein the fluid is made to flow through the detection passages and toward the detector; and
   a pair of projections, which project respectively from inner wall surfaces of the first and second passages, the detection passages being disposed within interior portions of the projections,
   wherein the detection passages open into the first and second passages via the projections.

2. The flow sensor according to claim 1, wherein heights of the projections with respect to the inner wall surfaces of the first and second passages are set to be the same.

3. The flow sensor according to claim 1, wherein a height of a projection disposed in the second passage is set to be greater than a height of a projection disposed in the first passage.

4. The flow sensor according to claim 2, wherein a distance with respect to the throttle section of one of the projections disposed in the first passage is set to be greater than a distance with respect to the throttle section of another of the projections disposed in the second passage, along the axial direction of the body.

5. The flow sensor according to claim 2, wherein the body includes annular recesses disposed on outer circumferential sides of the detection passages, and which are recessed in a radial outward direction with respect to the inner wall surface.

6. The flow sensor according to claim 2, wherein the detector comprises an introduction passage having a U-shape in cross section that communicates with the detection passages and into which the fluid is introduced through the detection passages.

7. The flow sensor according to claim 2, wherein the detector outputs the flow rate of the fluid detected by the detector to a controller or a display device.

8. The flow sensor according to claim 2, wherein annular seal members are provided respectively in the detector and surround the detection passages, the seal members being retained between the detector and the body.

9. The flow sensor according to claim 1, wherein a rectifying element, made up from a thin plate having a plurality of orifices therein and which is capable of removing debris in the fluid, is installed in the first passage.

10. The flow sensor according to claim 1, wherein the first and second projections are formed with elliptical shapes in cross section, the elliptical shapes having a major axis along the axial direction of the body and a minor axis perpendicular to the axial direction.

* * * * *